United States Patent

Suzuki et al.

[15] 3,674,769
[45] July 4, 1972

[54] CRYSTALLINE PROPYLENE POLYMER COMPOSITIONS OF IMPROVED WORKABILITY

[72] Inventors: Reiichi Suzuki, Nishinomiya; Tadasu Tahara, Suita; Hideo Mototani, Amagasaki, all of Japan

[73] Assignee: Nitto Kasei Co., Ltd., Osaka, Japan

[22] Filed: June 10, 1970

[21] Appl. No.: 45,260

[30] Foreign Application Priority Data

June 17, 1969 Japan....................................44/48203

[52] U.S. Cl. ......................................260/93.7, 260/94.9 GD
[51] Int. Cl..................C08f 29/02, C08f 45/34, C08f 45/40
[58] Field of Search......................260/94.9 GD, 94.9 G, 93.7

[56] References Cited

UNITED STATES PATENTS 3,154,529 10/1964 Kobayashi et al.....................260/93.7
3,553,176 1/1971 Fujisaki et al.........................260/78.4

*Primary Examiner*—Joseph L. Schofer
*Assistant Examiner*—William F. Hamrock
*Attorney*—Brown, Lewis C., Kenneth G. Wheeless and Robert P. Grindle

[57] ABSTRACT

A plastic composition of improved workability comprises substantially crystalline propylene polymer, and an additive combination consisting of (a) an organotin benzoate derivative having the formula

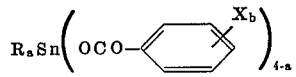

wherein R is a saturated or unsaturated hydrocarbon radical of one to 12 carbon atoms, X is hydrogen, halogen, lower alkyl, hydroxyl or alkoxyl, and $a$ and $b$ are 1–3, and (b) a phenolic compound.

26 Claims, No Drawings

CRYSTALLINE PROPYLENE POLYMER COMPOSITIONS OF IMPROVED WORKABILITY

This invention relates to crystalline propylene polymer compositions of improved workability containing an organotin benzoate derivative and a phenolic compound.

A crystalline propylene polymer is in wide use, as applied to fibers, films, and other shaped articles. However, many of the crystalline propylene polymers obtained by the general polymerization method which is considered to be economical may be of high mean molecular weight and high melt viscosity. This may cause difficulties in forming shaped articles, in particular fiber and laminate products, e.g. fibers, films, etc.

Certain compounds have been added to crystalline polypropylene in attempts to modify its mean molecular weight thereby giving a polymer of suitable intrinsic viscosity for easy processing thereof. Various organotin compounds are known to be effective for this purpose. However, these organotin compounds, when used alone, have the disadvantage common to their use that the mean molecular weight of the polymer may be modified out of proportion to the amount of the organotin compound added. Further the use of different kinds may show respectively distinctive modification behaviors.

According to this invention, these adverse effects may be reduced or eliminated by employing certain organotin compounds in combination with phenolic compounds in the crystalline propylene polymer, and the mean molecular weight of the polymer may be controlled easily.

Therefore, it is an object of this invention to provide a polypropylene resin composition having improved workability, and a method for the preparation of such compositions. Other objects, features and advantages of this invention will be apparent from the following description.

This invention is a crystalline propylene polymer composition of improved workability which comprises substantially crystalline propylene polymer containing more than about 80 percent by weight of crystalline part based on the weight of the whole polymer and 0.02–2.0 percent by weight of a combination consisting of (a) between 0.01 and 1.0% by weight of an organotin benzoate derivative having the formula

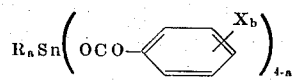

wherein R is a saturated or unsaturated hydrocarbon radical of one to 12 carbon atoms, X is selected from the group consisting of hydrogen, halogen, lower alkyl, hydroxyl and alkoxyl, and $a$ and $b$ are each integers of from 1 to 3, inclusive, and (b) between 0.01 and 1.0 percent by weight of a phenolic compound.

Further this invention is a process for preparing a crystalline propylene polymer composition of improved workability which comprises mixing a substantially crystalline propylene polymer containing more than about 80 percent by weight of crystalline part based on the weight of the whole polymer with 0.02–2.0 percent by weight of a combination consisting of (a) an organotin benzoate derivative having the formula

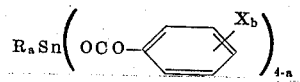

wherein R is a saturated or unsaturated hydrocarbon radical of one to 12 carbon atoms, X is selected from the group consisting of hydrogen, halogen, lower alkyl, hydroxyl and alkoxyl, and $a$ and $b$ are each integers of from 1 to 3, inclusive, and (b) a phenolic compound, and heating the mixture to a temperature between 230 and 350° C.

Examples of organotin benzoate derivatives used in combination with phenolic compounds in the composition of this invention include, for example:
methyltin tribenzoate
methyltin tris(o-hydroxybenzoate)
dimethyltin dibenzoate
dimethyltin bis(p-methylbenzoate)
dimethyltin bis(p-methoxybenzoate)
trimethyltin-p-chlorobenzoate
butyltin tribenzoate
butyltin tris(p-chlorobenzoate)
dibutyltin dibenzoate
dibutyltin bis(p-tertiary-butylbenzoate)
dibutyltin bis(p-chlorobenzoate)
dibutyltin bis(p-methylbenzoate)
dibutyltin bis(p-methoxybenzoate)
dibutyltin bis(o-hydroxybenzoate)
tributyltin benzoate
diamyltin dibenzoate
dihexyltin bis(p-chlorobenzoate)
octyltin tribenzoate
octyltin tris(p-methoxybenzoate)
dioctyltin dibenzoate
dioctyltin bis(p-chlorobenzoate)
dioctyltin bis(p-methoxybenzoate)
dioctyltin bis(p-tertiary-butylbenzoate)
dioctyltin bis(p-hydroxybenzoate)
trioctyltin-p-chlorobenzoate
trioctyltin-o-butoxybenzoate
dicyclohexyltin dibenzoate
dicyclohexyltin bis(p-methylbenzoate)
diallyltin dibenzoate
dibenzyltin dibenzoate
dibenzyltin bis(p-methoxybenzoate)
tribenzyltin-p-chlorobenzoate Examples of phenolic compounds contained in the compositions of this invention include, for example, alkyl or alkylene substituted phenols such as:
p-octylphenol
p-nonylphenol
p-dodecylphenol
2,4-di-tertiary-butylphenol
2,6-di-tertiary-butyl-4-methylphenol
2,2-bis(4-hydroxyphenyl)propane
1,1-bis(2-methyl-4-hydroxy-5-tertiary-butylphenyl)cyclohexane
2,2'-methylene bis(6-tertiary-butyl-4-methylphenol)
4,4'-butylidene-bis(6-tertiary-butyl-3-methylphenol)
1,3,5-trimethyl-2,4,6-tris(3,5-di-tertiary-butyl-4-hydroxybenzyl)benzene
2,4,6-tri-tertiary-butylphenol
1,1'-methylene-bis(4-hydroxy-2,5-di-tertiary-butylphenol)
1,1,3-tris-2,5-di-tertiary-butyl-4-hydroxphenylbutane substituted phenols such as:
2,5-di-tertiary-butyl hydroquinone
2,5-di-tertiary-butyl-4-hydroxyanisol
α-naphthol
β-naphthol
binaphthol
phenylsalicylate
octyl-4-hydroxybenzoate
benzophenone derivatives such as:
2,4-dihydroxybenzophenone
2-hydroxy-4-methoxybenzophenone
2-hydroxy-4-octoxybenzophenone
phenol sulfides such as:
2,2'-thio-bis(4-methyl-6-tertiary-butylphenol)
4,4'-thio-bis(3-methyl-6-tertiary-butylphenol)
hydroxphenylpropionic acid derivatives such as:
n-octadecyl-α-(3,5-di-tertiary-butyl-4-hydroxyphenol)propionate
hexamethyleneglycol bis[3-(3,5-di-tertiary-butyl-4-hydroxyphenyl)propionate]

The most effective phenolic compounds are those which are least volatilized during heat treatment of the polymer composition. Therefore, it is preferred that the phenolic compound have a high boiling point. Any of the phenolic compounds illustrated exhibit a boiling point of 280° C or higher.

Although it is known that an organotin compound may be effective, the manner in which a crystalline propylene polymer is modified to a certain value of mean molecular weight may be irrespective of the quantity (within the range of practical use i.e., 0.05–0.3 percent by weight of the polymer) of the organotin compound. For example, dibutyltin dibenzoate may show results as set forth in Table 1.

TABLE 1

Compound (I): Dibutyltin dibenzoate
Treatment Temperature: 260°C

| Amount of I added (%) | Heating (minute) | | | |
|---|---|---|---|---|
| | 5 | 10 | 20 | 50 |
| 0.05 | 3.8 | 2.2 | 1.5 | 1.4 |
| 0.10 | 3.5 | 2.1 | 1.4 | 1.3 |
| 0.20 | 3.4 | 2.1 | 1.4 | 1.3 |
| 0.30 | 3.3 | 2.0 | 1.3 | 1.3 |

From Table 1, it will be apparent that the mean molecular weight or intrinsic viscosity following 10, 20 and 50 minutes of heating is essentially independent of the amount of modifier added. It may be that any modification beyond the values shown must greatly depend upon a manipulative change of temperature and time; however, the method would be impractical.

Generally the intrinsic viscosity of the polymer suitable for forming a fiber and a film may be 0.8–2.5 as determined in Tetraline solution at 135° C. It should be determined within a strict range according to the size and strength of fiber, and the thickness and strength of film and their uses.

The addition of a phenolic compound permits attainment of the crystalline propylene polymer which may satisfy the requirements. Thus, according to this invention a crystalline propylene polymer having a desired range of intrinsic viscosity, i.e. the polymer of improved workability may be obtained very easily by adding an organotin benzoate derivative and a phenolic compound to a crystalline propylene polymer and selecting the optimum amount of both ingredients. With regard to the relation between these additives and the intrinsic viscosity, when varying concentrations of a phenolic compound are used and the concentration of organolin benzoate remains unchanged, the intrinsic viscosity may change proportionally, but when the amount of the organotin benzoate derivative is changed, the proportional relation may not necessarily be seen. Therefore, it is preferable that the intrinsic viscosity be controlled by the phenolic compound. During the process of producing shaped articles, the organotin benzoate derivative containing composition may be susceptible to a slight change of temperature; however, it may be stabilized by the addition thereto of the phenolic compound. Thus, the products obtained by the method of this invention may be of homogeneous quality and strength, and this method may be suitable particularly for the formation of fiber products, films, and laminae.

The above-mentioned effects of this invention may be peculiar to the phenolic compound and may not be observed by the addition of those other than phenolic compounds, e.g. sulfur containing organic compounds, epoxy compounds, phosphorus containing compounds, nitrogen containing organic compounds, etc.

The polymer compositions of this invention may be obtained by adding an organotin benzoate derivative and a phenolic compound together with other additives to crystalline propylene polymer powder prepared by the conventional method. The amount added of the organotin benzoate derivative and the phenolic compound each may be 0.01–1.0 percent by weight based on the weight of the polymer, preferably 0.05–0.3 percent by weight. Usually, the crystalline propylene polymer powder is sold in the form of a pellet which is prepared by a pelleting machine of extruder type. The pellet polymer is then heated and molded. In the practice of this invention, before this thermal treatment the organotin benzoate derivative and the phenolic compound may be added to the polymer in an amount defind beforehand so as to give a polymer composition having a desired value of intrinsic viscosity.

The polymer compositions of this invention may be heat treated at 230°–350° C, preferably 250°–310° C. Since the organotin and the phenolic compounds may be of a high boiling point and non-volatile, the thermal treatment and the processing thereafter can be conducted at elevated temperatures over a prolonged period of time. The treatment may usually be effected by Banbury mixer, calender roll, screw conveyor, etc., in an air or a nitrogen atmosphere. When the polymer composition has attained the desired inherent viscosity it may then be molded or otherwise shaped as required. The suitable value of intrinsic viscosity may usually be within the range of 0.8–2.2 for the formation of a film, 0.8–2.0 for the formation of a fiber of low denier, and 1.5–2.5 for the formation of a fiber of high denie, as determined in Tetraline solution at 135° C. The intrinsic viscosity may be selected according to the thickness of film, the denier and strength of fiber, and their uses. In the practice of the process of this invention, the polymer of any suitable range of intrinsic viscosity may be obtained easily.

Films, lamination products, fiber products, and other various molded articles may be made by melt extrusion technique, injection molding, blow-molding, etc. The polymer compositions of this invention may exhibit improved workability, especially in the formation of films and fiber products.

Molded articles having desirable mechanical properties may be made by employing the polymer compositions of this invention by any conventional technique. For example, a film may be made by calender technique, and may be molded at about 80°–150° C. The obtained film may be suitable for use as wrapping materials. Fibers may be made by melt extrusion technique first by homogenizing the polymer composition at 200°–300° C for a few minutes and then by spinning at 150°–230° C. Fibers which are satisfactory in strength, wear resistance, elasticity, light resistance, and ageing resistance may be obtained from the polymer compositions of this invention. The organotin benzoate derivatives may render the polymer compositions resistant to heat and light. Other molded articles may be obtained by ordinary methods.

EXAMPLE 1

Dibutyltin dibenzoate I and n-octadecyl-$\beta$-(3,5-di-tertiary butyl-4-hydroxyphenyl)propionate II were added in the amount noted in Table 2 to a propylene polymer powder containing, determined as an insoluble in n-heptane, 91.8 percent of crystalline polymer part and having an intrinsic viscosity of 7.3. They were mixed by a Henschel mixer. The resultant polymer compositions were placed in nitrogen flushed, hermetically sealed containers and each was heated to 260° C. for 5, 10, 20 and 50 minutes. The intrinsic viscosity of each polymer treated was as Table 2 shows. Results when compound I alone is used under the same conditions as above are shown in Table 1.

TABLE 2

| Exp. No. | Amount added (% by weight) of | | Heating (minute) | | | |
|---|---|---|---|---|---|---|
| | I | II | 5 | 10 | 20 | 50 |
| 1 | 0 | 0 | 7.2 | 7.0 | 6.5 | 4.3 |
| 2 | 0.10 | 0 | 3.5 | 2.1 | 1.4 | 1.3 |
| 3 | 0.05 | 0.1 | 5.5 | 2.8 | 1.8 | 1.8 |
| 4 | 0.1 | 0.1 | 4.6 | 2.3 | 1.8 | 1.7 |
| 5 | 0.2 | 0.1 | 4.6 | 2.1 | 1.7 | 1.6 |
| 6 | 0.1 | 0.05 | 4.3 | 2.2 | 1.6 | 1.5 |
| 7 | 0.1 | 0.2 | 5.3 | 3.0 | 2.0 | 1.9 |
| 8 | 0.1 | 0.3 | 5.8 | 3.4 | 2.3 | 2.1 |

From Tables 1 and 2, it is apparent that the practice of this invention produces satisfactory results.

EXAMPLE 2

Dioctyltin bis(p-chlorobenzoate) III and hexamethyleneglycol-bis[3-(3,5-di-tertiary butyl-4-hydroxyphenyl)propionate] IV were added in the amount noted in Table 3 to a polypropylene powder of crystalline polymer content 93.2 percent as determined as an insoluble in n-heptane, having an intrinsic viscosity of 5.7. They were mixed by a Henschel mixer. The thus obtained polymer composition was placed in a nitrogen flushed, hermetically sealed container and each heated to 280° C for 5 minutes, 10 minutes, 20 minutes, and 50 minutes. The intrinsic viscosity of each polymer treated was determined, and the results are shown in Table 3.

TABLE 3

| Exp. No. | Amount added (% by weight) of | | Heating (minute) | | | |
|---|---|---|---|---|---|---|
| | III | IV | 5 | 10 | 20 | 50 |
| 9  | 0     | 0    | 5.4 | 5.4 | 5.0 | 3.1 |
| 10 | 0.15  | 0    | 2.8 | 1.9 | 1.4 | 1.3 |
| 11 | 0.30  | 0    | 2.6 | 1.8 | 1.3 | 1.2 |
| 12 | 0.15  | 0.05 | 3.6 | 2.3 | 1.6 | 1.5 |
| 13 | 0.15  | 0.1  | 3.9 | 2.6 | 1.7 | 1.7 |
| 14 | 0.15  | 0.2  | 4.0 | 2.8 | 1.9 | 1.9 |
| 15 | 0.075 | 0.1  | 3.8 | 2.6 | 1.8 | 1.7 |
| 16 | 0.30  | 0.1  | 3.7 | 2.4 | 1.7 | 1.6 |

EXAMPLE 3

Dibutyltin bis(p-methoxybenzoate) V and 1,1,3-tris(2,5-di-tertiary butyl-4-hydroxyphenyl) butane VI were added in the amount noted in Table 4 to a propylene polymer of crystalline polymer content 91 percent as determined as an insoluble in n-heptane, having an intrinsic viscosity of 2.9. They were mixed by a Henschel mixer. The thus obtained polymer composition was placed in a nitrogen flushed, hermetically sealed container, and each heated to 290° C for 5, 10, 20 and 50 minutes. The intrinsic viscosity of each polymer treated was determined and the results are shown in Table 4.

TABLE 4

| Exp. No. | Amount added (% by weight) of | | Heating (minute) | | | |
|---|---|---|---|---|---|---|
| | V | VI | 5 | 10 | 20 | 50 |
| 17 | 0.05 | 0.1  | 2.3 | 2.0 | 1.5 | 1.4 |
| 18 | 0.08 | 0.1  | 2.3 | 1.9 | 1.4 | 1.4 |
| 19 | 0.15 | 0.1  | 2.2 | 1.6 | 1.3 | 1.3 |
| 20 | 0.30 | 0.1  | 2.1 | 1.6 | 1.2 | 1.2 |
| 21 | 0.15 | 0.05 | 2.0 | 1.4 | 1.1 | 1.1 |
| 22 | 0.15 | 0.3  | 2.4 | 2.1 | 1.7 | 1.6 |

EXAMPLE 4

Dibutyltin bis(p-tertiary butylbenzoate) VII and 1,3,5-trimethyl-2,4,6-tris(3,5-di-tertiary butyl-4-hydroxy-benzyl)benzene VIII were added in the amount noted in Table 5 to a propylene polymer of crystalline polymer content 93.2 percent as determined as an insoluble in n-heptane, having an intrinsic viscosity of 5.7. They were mixed by a Henschel mixer. The thus obtained polymer composition was placed in a glass container, and each heated to 250° C for 5, 10, 20 and 50 minutes in the presence of air. The intrinsic viscosity of each polymer treated was determined, and the results are shown in Table 5.

TABLE 5

| Exp. No. | Amount added (% by weight) of | | Heating (minute) | | | |
|---|---|---|---|---|---|---|
| | VII | VIII | 5 | 10 | 20 | 50 |
| 23 | 0.05 | 0.1  | 4.0 | 2.7 | 1.7 | 1.7 |
| 24 | 0.1  | 0.1  | 3.8 | 2.7 | 1.7 | 1.6 |
| 25 | 0.3  | 0.1  | 3.2 | 2.3 | 1.5 | 1.5 |
| 26 | 0.15 | 0.05 | 3.4 | 2.2 | 1.4 | 1.4 |
| 27 | 0.1  | 0.2  | 3.9 | 3.1 | 2.0 | 1.9 |

EXAMPLE 5

Trioctyltin salicylate IX and 4,4'-thio-bis(6-tertiary butyl-m-cresol) X were added in the amount noted in Table 6 to the same propylene polymer as employed in Example 1. They were mixed by a Henschel mixer. The thus obtained polymer composition was placed in a nitrogen flushed, hermetically sealed container, each heated to 300° C for 5, 10, 20, and 50 minutes. The intrinsic viscosity of each polymer treated was determined, and the results are shown in Table 6.

TABLE 6

| Exp. No. | Amount added (% by weight) of | | Heating (minute) | | | |
|---|---|---|---|---|---|---|
| | IX | X | 5 | 10 | 20 | 50 |
| 28 | 0.05  | 0.1 | 4.9 | 3.1 | 1.6 | 1.6 |
| 29 | 0.075 | 0.1 | 4.8 | 2.7 | 1.6 | 1.5 |
| 30 | 0.1   | 0.1 | 4.3 | 2.6 | 1.5 | 1.4 |
| 31 | 0.2   | 0.1 | 3.8 | 2.4 | 1.4 | 1.4 |
| 32 | 0.1   | 0.2 | 4.9 | 3.1 | 1.8 | 1.7 |

EXAMPLE 6

Dibutyltin bis(p-tertiary butylbenzoate) XI and p-nonylphenol XII were added in the amount noted in Table 7 to the same propylene polymer as employed in Example 3. They were mixed by a Henschel mixer. The obtained polymer composition was placed in a nitrogen flushed, hermetically sealed container, and each heated to 250° C for 5, 10, 20, and 50 minutes. The intrinsic viscosity of each polymer treated was determined, and the results are shown in Table 7.

TABLE 7

| Exp. No. | Amount added (% by weight) of | | Heating (minute) | | | |
|---|---|---|---|---|---|---|
| | XI | XII | 5 | 10 | 20 | 50 |
| 33 | 0.05 | 0.1  | 2.2 | 1.9 | 1.6 | 1.4 |
| 34 | 0.1  | 0.1  | 2.2 | 1.8 | 1.5 | 1.4 |
| 35 | 0.2  | 0.1  | 2.0 | 1.6 | 1.3 | 1.3 |
| 36 | 0.1  | 0.05 | 1.9 | 1.5 | 1.2 | 1.1 |
| 37 | 0.1  | 0.2  | 2.3 | 2.0 | 1.7 | 1.6 |

Although this invention has been illustrated by reference to specific examples, numerous changes and modifications thereof which clearly fall within the scope of the invention will be apparent to those skilled-in-the-art.

We claim:

1. A crystalline propylene polymer composition having an intrinsic viscosity of 0.8 to 2.5 as determined in tetraline solution at 185° C of improved workability which comprises substantially crystalline propylene polymer containing more than about 80 percent by weight of crystalline part based on the weight of the whole polymer and 0.02–2.0 percent by weight of a combination consisting of (a) between 0.01 and 1.0 percent by weight of an organotin benzoate derivative having the formula

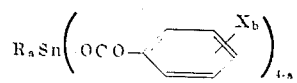

wherein R is a saturated or unsaturated hydrocarbon radical of one to 12 carbon atoms, X is selected from the group consisting of hydrogen, halogen, lower alkyl, hydroxyl and alkoxyl, and *a* and *b* are each integer of from 1 to 3, inclusive, (b) between 0.01 and 1 percent by weight of a phenolic compound exhibiting a boiling point of 280° C. or higher.

2. The composition of claim 1 wherein said organotin benzoate derivative is present in an amount of 0.05–0.3 percent of the weight of the polypropylene, and said phenolic compound is present in amount of 0.05–0.3 percent of the weight of the polypropylene.

3. The composition of claim 1 wherein said organotin benzoate derivative is dibutyltin dibenzoate.

4. The composition of claim 1 wherein said organotin benzoate derivative is dioctyltin bis(p-chlorobenzoate).

5. The composition of claim 1 wherein said organotin benzoate derivative is dibutyltin bis(p-methoxybenzoate).

6. The composition of claim 1 wherein said organotin benzoate derivative is dibutyltin bis(p-tertiary butylbenzoate).

7. The composition of claim 1 wherein said organotin benzoate derivative is trioctyltin salicylate.

8. The composition of claim 1 wherein said phenolic compound is n-octadecyl-β-(3,5-di-tertiary butyl-4-hydroxyphenyl) propionate.

9. The composition of claim 1 wherein said phenolic compound is hexamethyleneglycol bis[3-(3,5-di-tertiary butyl-4-hydroxyphenyl)propionate].

10. The composition of claim 1 wherein said phenolic compound is 1,1,3-tris(2,5-di-tertiary butyl-4- hydroxyphenyl)butane.

11. The composition of claim 1 wherein said phenolic compound is 1,3,5-trimethyl-2,4,6-tris(3,5-di-tertiary butyl-4-hydroxybenzyl)benzene.

12. The composition of claim 1 wherein said phenolic compound is 4,4'-thio-bis(6-tertiary butyl-m-cresol).

13. The composition of claim 1 wherein said phenolic compound is p-nonylphenol.

14. A process for preparing a crystalline propylene polymer composition having an intrinsic viscosity of 0.8 to 2.5 as determined in tetraline solution at 135° C of improved workability which comprises mixing a substantially crystalline propylene polymer containing more than about 80 percent by weight of crystalline part based on the weight of the whole polymer with 0.02–2.0 percent by weight of a combination consisting of (a) between 0.01 and 1.0 percent by weight of an organotin benzoate derivative having the formula

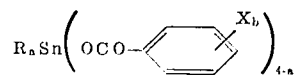

wherein R is a saturated or unsaturated hydrocarbon radical of one to 12 carbon atoms, X is selected from the group consisting of hydrogen, halogen, lower alkyl, hydroxyl, and alkoxyl, and *a* and *b* are each integers of from 1 to 3, inclusive, and (b) between 0.01 and 1.0 percent by weight of a phenolic compound exhibiting a boiling point of 280° C. or higher, and heating the mixture to a temperature between 230° and 350° C.

15. The process of claim 14 wherein said organotin benzoate derivative is present in amount of 0.05–0.3 percent of the weight of the polypropylene, and said phenolic compound is present in amount of 0.05–0.3 percent of the weight of the polypropylene.

16. The process of claim 14 wherein said organotin benzoate derivative is dibutyltin dibenzoate.

17. The process of claim 14 wherein said organotin benzoate derivative is dioctyltin bis(p-chlorobenzoate).

18. The process of claim 14 wherein said organotin benzoate derivative is dibutyltin bis(p-methoxybenzoate).

19. The process of claim 14 wherein said organotin benzoate derivative is dibutyltin bis(p-tertiary butylbenzoate).

20. The process of claim 14 wherein said organotin benzoate derivative is trioctyltin salicylate.

21. The process of claim 14 wherein said phenolic compound is n-octadecyl-β-(3,5-di-tertiary butyl-4-hydroxyphenyl)propionate.

22. The process of claim 14 wherein said phenolic compound is hexamethyleneglycol bis[3-(3,5-di-tertiary-butyl-4-hydroxyphenyl)proionate]

23. The process of claim 14 wherein said phenolic compound is 1,1,3-tris(2,5-di-tertiary butyl-4-hydroxphenyl)butane.

24. The process of claim 14 wherein said phenolic compound is 1,3,5-trimethyl-2,4,6-tris(3,5-di-tertiary butyl-4-hydroxybenzyl)benzene.

25. The process of claim 14 wherein said phenolic compound is 4,4'-thio-bis-(6-tertiary butyl-m-cresol).

26. The process of claim 14 wherein said phenolic compound is p-nonylphenol.

* * * * *